Sept. 18, 1928.  A. F. MASURY ET AL  1,684,404
BRAKE MECHANISM
Filed May 23, 1924   4 Sheets-Sheet 4
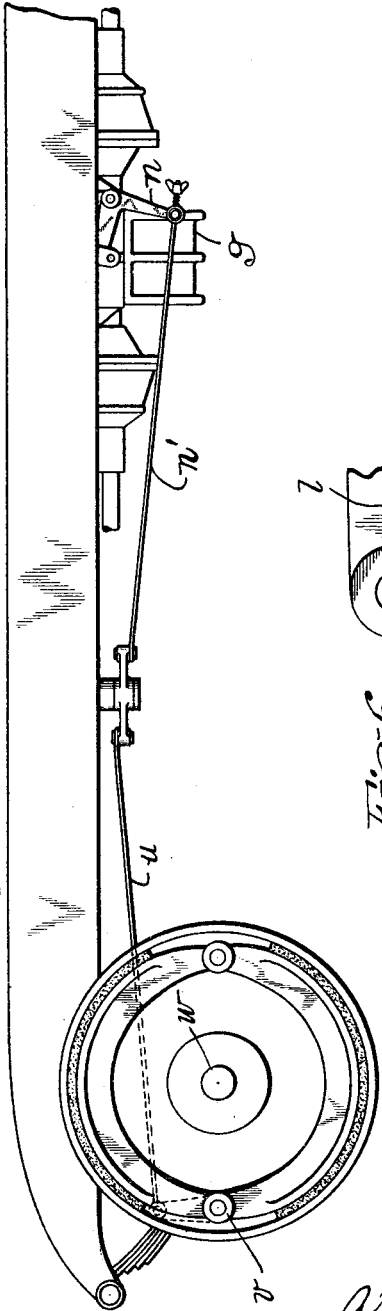
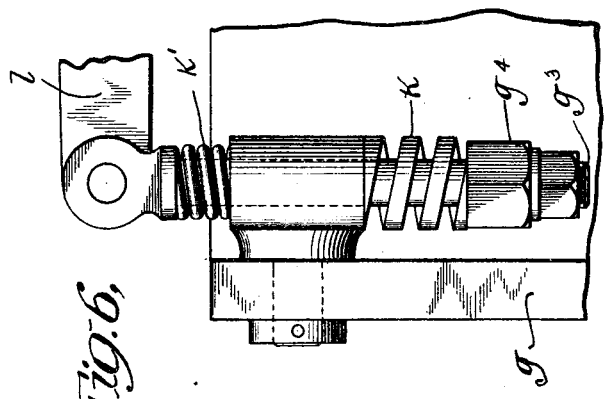

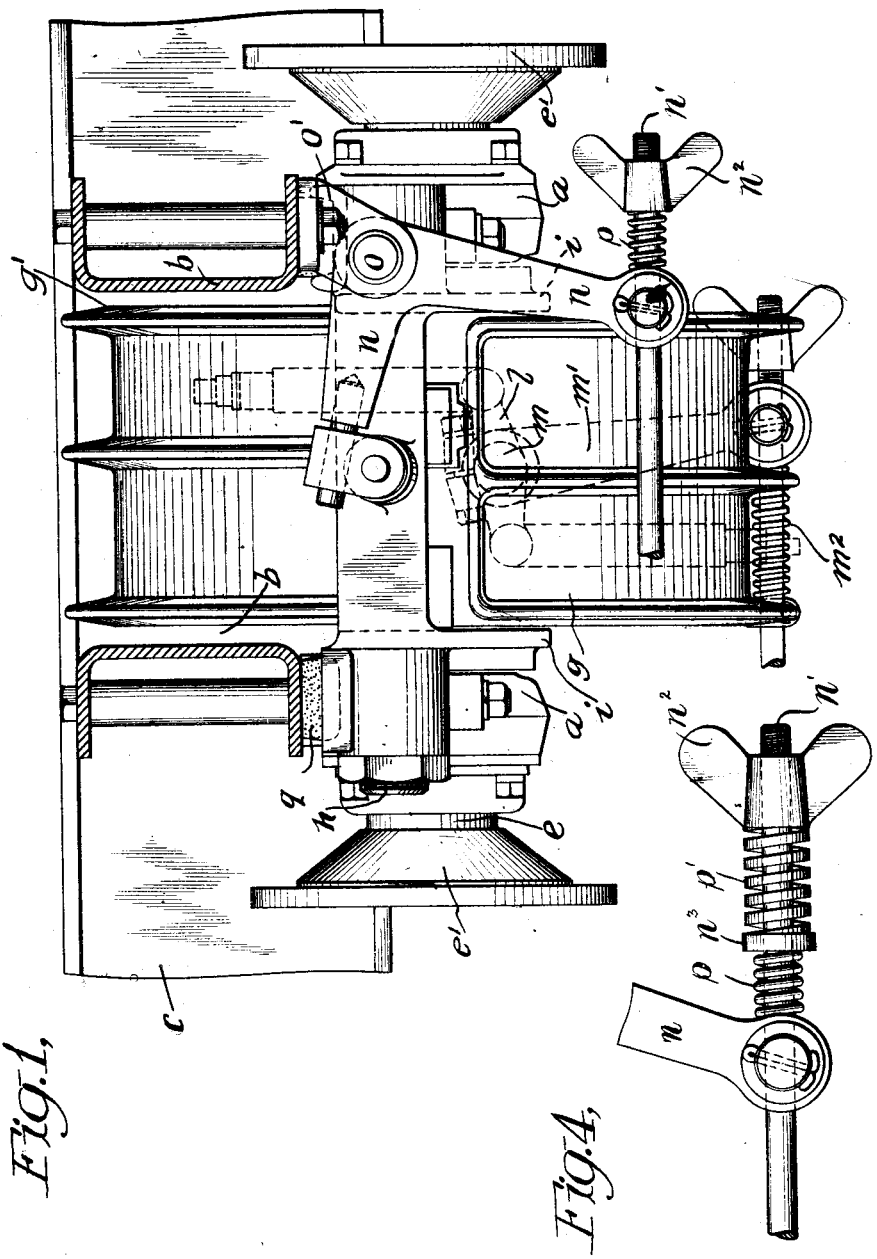

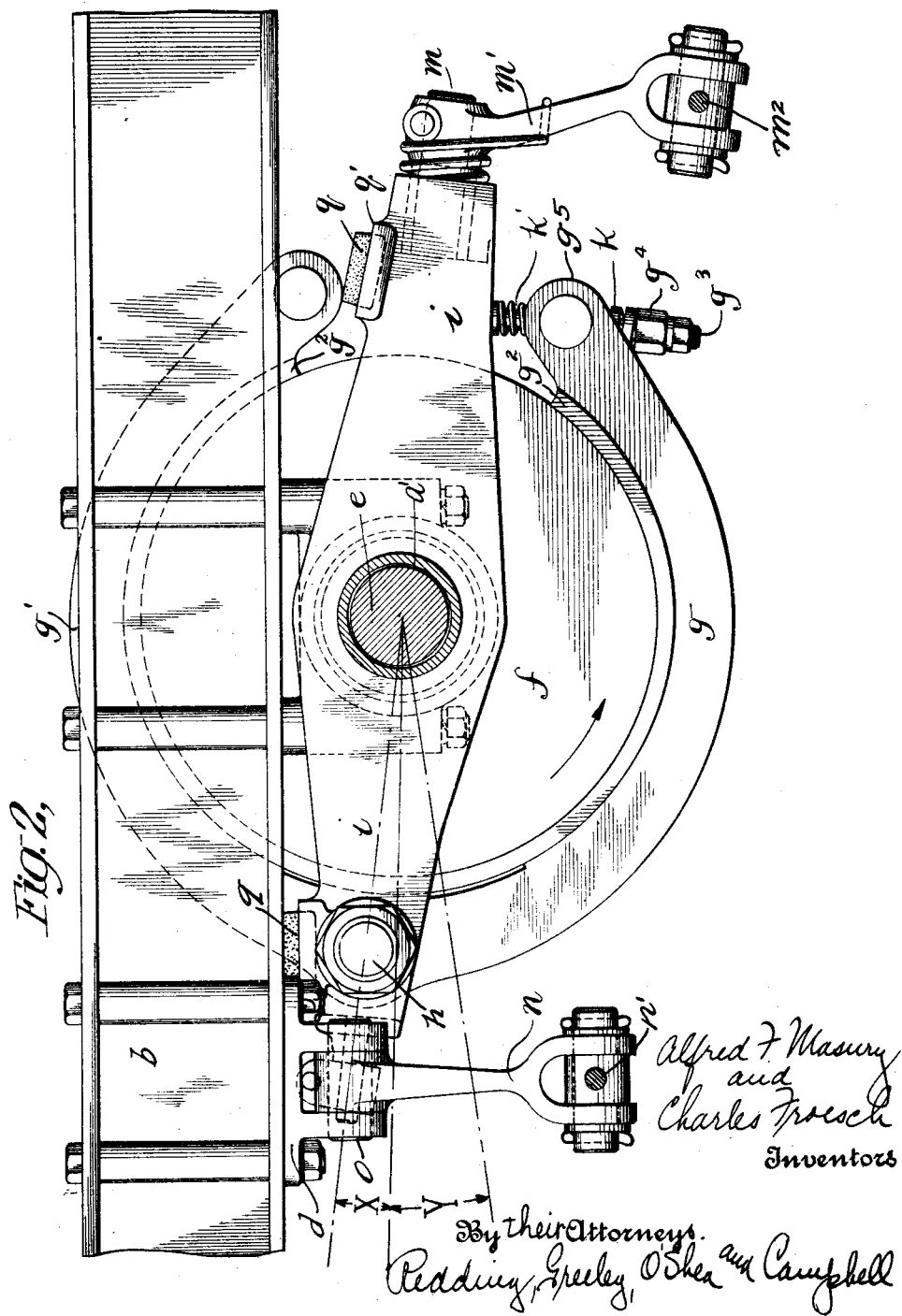

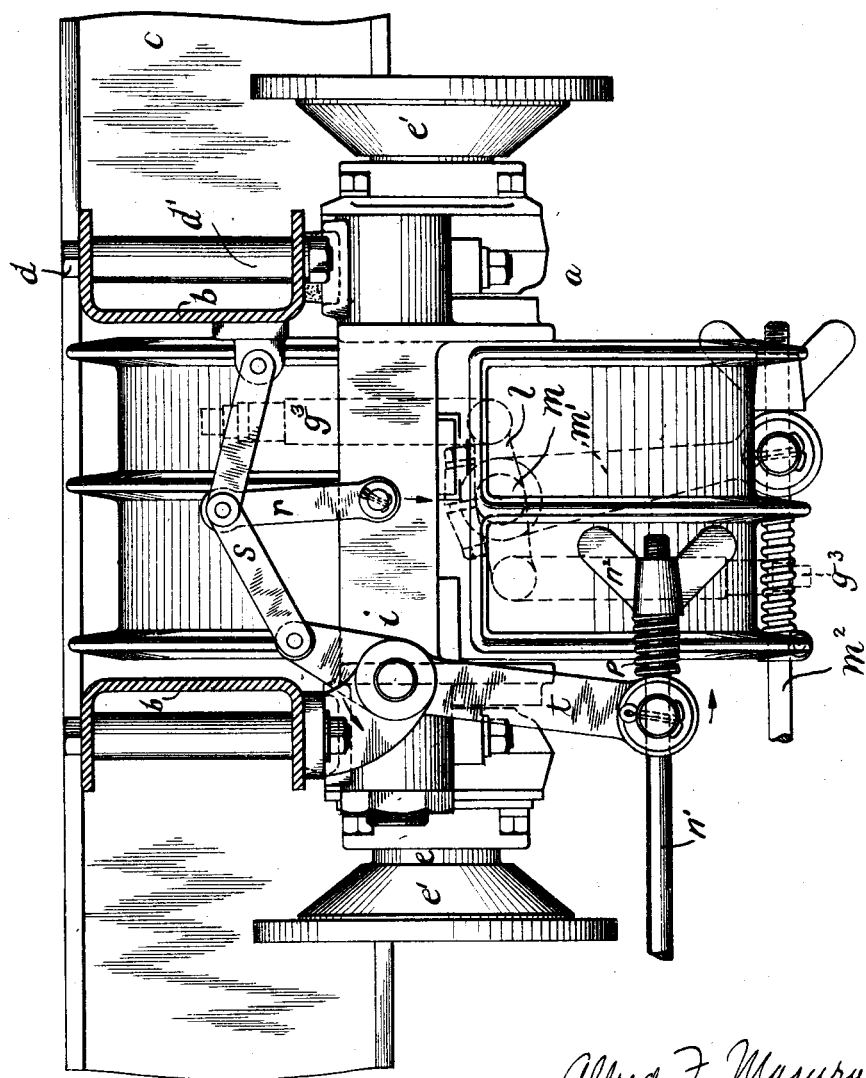

Patented Sept. 18, 1928.

1,684,404

UNITED STATES PATENT OFFICE.

ALFRED F. MASURY AND CHARLES FROESCH, OF NEW YORK, N. Y., ASSIGNORS TO INTERNATIONAL MOTOR COMPANY, OF NEW YORK, N. Y., A CORPORATION OF DELAWARE.

BRAKE MECHANISM.

Application filed May 23, 1924. Serial No. 715,297.

This invention relates to brake mechanism and more particularly to brake mechanism adapted for motor vehicles in which the braking effect is utilized for actuation of other mechanism such as remotely disposed brake mechanism in situations where the first named brake mechanism is associated with the propeller shaft and the last named brake mechanism is associated with one of the wheels of the vehicle. It is an object of the invention to provide operative connections between a brake adapted to be actuated at the will of the operator and remotely disposed mechanism whereby said remote mechanism is caused to be actuated as a result of the application of braking power by the manually operated brake. Accordingly the brake shoes are mounted upon a movable brake anchor or cradle so that when, as a result of the friction between the brake shoe and brake drum, the brake shoe tends to travel with the drum about its axis, this movement is translated to other mechanism for appropriate actuation thereof. Another object of the invention is to utilize the disposition of parts just described to actuate remotely disposed brake mechanism on, for instance, a wheel of a vehicle when the brake mechanism is disposed, say on the propeller shaft. Accordingly the brake at the vehicle wheel is provided with an actuating rod and suitable linkage or a system of levers is provided between the rod and the movable brake cradle whereby motion of the cradle is translated to the rod to effect actuation of the brake at the wheel. A further object of the invention is to permit the application of what may be termed the primary brake to a predetermined degree before the brake at the wheel is actuated whereby, as in the case of a brake on the front wheel of a motor vehicle, said brake is rendered more efficient as the momentary shift of weight of the vehicle towards the front is utilized. Accordingly a resilient device, such as a spring, is interposed between the system of levers and the connecting rod to the brake at the wheel. Another object of the invention is to incorporate in the mechanism shock absorbing elements whereby shocks and stresses set up during the operation of the mechanism are cushioned or absorbed. Accordingly a resilient device such as a heavy spring is incorporated in the operative connections between the two brake mechanisms whereby shocks resulting, for instance, from "chattering" are absorbed. Cushions of yielding non-metallic material may be disposed upon the brake cradle or in appropriate positions on the vehicle frame to prevent undue shocks in the extreme positions taken by the cradle in cases where excessive wear of the brake shoe linings results in an excessive angle of rotation of the brake shoes with respect to the axis of the drum.

The invention has been illustrated as incorporating as the primary brake, a brake upon the propeller shaft of the same general type as that illustrated in Patent No. 1,485,686 dated March 4, 1924. While this type of brake has been found particularly advantageous in connection with the present improvements, it will be apparent as the description proceeds, that any brake is equally applicable.

The foregoing and other objects of the invention will be more apparent from the following detailed description of means for their attainment illustrated as a preferred embodiment thereof in the accompanying drawings in which:

Figure 1 is a view in side elevation of the improved brake mechanism showing the method of its attachment to a vehicle frame and the means for utilizing the tendency of the brake shoes for angular movement.

Figure 2 is a view in end elevation looking from the left in Figure 1 and showing the manner of mounting the brake shoe upon a pivoted cradle, the movement of which is utilized to effect the actuation of remote mechanism.

Figure 3 is a view similar to Figure 1, but showing a modification of the operative connections serving to translate motion of the brake shoes to remote mechanism.

Figure 4 is a fragmentary view showing the interposition of auxiliary springs whereby a sequence in operation of the principal and supplemental mechanisms is obtained.

Figure 5 is a side elevation of the mechanism as applied to the vehicle, showing the connection to the front brakes.

Figure 6 is a detail view of the link and connection to the servo brake shoe whereby the servo brake is applied.

As in the patented construction bearing housings $a$ are removably supported upon transverse members $b$ extending between the longitudinal side frame members $c$ of a motor vehicle as by bolts $d$ passing through sleeves $d'$.

In the bearing housing $a$ is journaled a section $e$ of a propeller shaft adapted to be coupled through any desired type of couplings $e'$ to adjacent sections of the propeller shaft (not shown) extending to appropriate elements in the motor vehicle. Carried upon the shaft $e$ and revoluble therewith is the brake drum $f$. Curved brake shoes $g, g'$ suitably lined as at $g^2$ are pivoted upon a transverse pin $h$ supported in a brake cradle comprising a pair of levers $i$ journaled, respectively, on the bearing housing $a$. The free end of each of the shoes $g$ carries a guide, not shown, for an operating bolt $g^3$ which passes through said guide and has at one side of the guide a spring $k$ which is interposed between the guide and adjustable nuts $g^4$ and has at the other side of the guide a spring $k'$ which is operatively interposed between the guide and the head of the operating bolt. The free end of the other brake shoe $g'$ has similar parts associated therewith. The heads of the bolts $g^3$ are pivotally connected to a cross arm $l$ carried on a rock shaft $m$ which is journaled in the cradle $i$ opposite to the bearing pin $h$. The rock shaft $m$ may carry an operating arm $m'$ connected as through linkage $m^2$ to any convenient device for operation of the brake.

Referring to Figure 1 it will be observed that the end of the cradle $i$ containing the pin $h$ is connected by means of a joint capable of universal movement with a bell-crank lever $n$ pivotally mounted by the pin $o$ in a bracket $o'$ secured to the cross member $b$. The free arm of lever $n$ is adapted to be mounted by suitable linkage $n'$ with any remote mechanism which it is desired to affect by movement of the cradle $i$. Such mechanism is not shown in the drawings, but it will be readily understood that any mechanism such as, for instance, brake actuating devices carried at the wheel of a motor vehicle may be suitably connected to the rod $n'$ whereby movement of the bell-crank lever $n$ about the pin $o$ will cause movement of the rod $n'$ to effect appropriate movement of the brake actuating devices. If, for instance, the brake actuating devices referred to are associated with the brakes on the front wheels of a vehicle, such front brakes will be found more efficient if the momentary shift of weight of the vehicle towards the front upon application of the propeller shaft brake is utilized. To this end provision is made for the consecutive operation of the two brakes, that is a degree of lost motion is permitted between the bell-crank lever $n$ and the rod $n'$ whereby the brake shoes $g, g'$ may be permitted to apply braking power to the propeller shaft for a predetermined interval before the brake at the wheel of the vehicle is affected. To this end a spring $p$ is interposed between an adjustable wing nut $n^2$ and the end of the lever $n$. It will thus be seen, referring to Figure 2, that application of the brake shoes $g, g'$ to the brake drum $f$ through the lever $m'$ and its associated mechanism will cause the brake shoes to engage the drum and as they are pivoted upon a movable brake anchor $i$ the friction between the drum and brake shoes will be sufficient to cause the movement of the brake cradle through the arc X. This movement will cause appropriate movement of the bell-crank lever $n$ without affecting the rod $n'$ until the spring $p$ is entirely compressed whereafter the rod $n'$ will be moved to cause actuation of the remote brake mechanism during further movement of the brake anchor through the angle $y$ during which time both the brakes are operating.

In Figure 4 there is disclosed a relatively stiff spring $p'$ interposed on the link $n'$ between the lever $n$ and the wing nut $n^2$. This relatively heavy spring serves as a shock absorbing element after the lighter spring $p$ has gone solid and absorbs or cushions shocks which would otherwise have a tendency to be transmitted between the respective mechanisms.

Buffers $q$ of yielding non-metallic material such as rubber may be carried in appropriate seats $q'$ on the cradle $i$ to prevent or cushion shocks which would otherwise be impressed upon the vehicle in extreme positions of the cradle when the ends thereof would otherwise contact with portions of the frame of the vehicle.

A modification of the linkage between the cradle $i$ and the brake actuating rod $n'$ is illustrated in Figure 3. In this instance, the end of the cradle is connected through a link $r$ to a toggle $s$ pivoted at its one end upon the frame $b$ and pivoted at its opposite end to a lever $t$ fulcrumed upon the frame $b$ and connected at its opposite end to the rod $n'$ in a manner similar to the connection of the bell-crank lever $n$. The operation of this device is apparent from an inspection of Figure 3 and may be found advantageous over the preferred construction in some instances where an increased application of power is desired to cause actuation of the remote brake mechanism but without increasing the braking power applied to drum $f$.

It will thus be seen that a construction is disclosed by which advantage may be taken of the braking effect at one brake mechanism to actuate remote mechanism such as another brake.

It will be apparent to those skilled in the art that various modifications may be made in the connections between the two brake mechanisms whereby advantage is taken of the tendency to movement of the brake anchor and no limitation is intended by the foregoing description except as indicated in the appended claims.

What we claim is:

1. In combination, a propeller shaft, a brake drum mounted on said propeller shaft, a movable brake shoe anchor, a brake shoe for engagement with said brake drum and carried with said anchor, a vehicle wheel, a brake drum carried thereby, a brake shoe, means to apply said last named brake shoe to said last named brake drum, operative connections between said movable brake shoe anchor and said means, and means to permit predetermined movement of the brake shoe anchor before the last named brake shoe is applied to the brake drum.

2. In combination, a propeller shaft, a brake drum mounted on said propeller shaft, a movable brake shoe anchor, a brake shoe for engagement with said brake drum, and carried with said anchor, a vehicle wheel, a brake drum carried thereby, a brake shoe, means to apply said last named brake shoe to said last named brake drum, operative connections between said movable brake shoe anchor and said means, a connecting rod and connections between the movable brake shoe anchor and the rod including resilient devices to permit predetermined movement of the brake shoe anchor before the last named brake shoe is applied to the brake drum.

3. In combination, a propeller shaft, a brake drum mounted on said propeller shaft, a movable brake shoe anchor, a brake shoe for engagement with said brake drum and carried with said anchor, a vehicle wheel, a brake drum carried thereby, a brake shoe, means to apply said last named brake shoe to said last named brake drum, operative connections between said movable brake shoe anchor and said means, a connecting rod, connections between the movable brake shoe anchor and the rod including a spring to permit application for a predetermined period of the first named brake shoe before the last named brake shoe is applied to the drum, and an auxiliary spring to cushion braking stresses.

4. In combination with the chassis and propeller shaft in a motor vehicle, bearings and housings for the shaft, a brake drum mounted on the shaft, brake shoes therefor, a cradle rotatably mounted upon the housings at either side of the drum, means mounting the brake shoes on one end of the cradle, the latter thus serving as a movable anchor for the former, means for engaging the brake shoes with the drum and means mounted on the other end of the cradle for operating a second brake upon movement of the cradle due to the engagement of the shoes with the brake drum.

This specification signed this 17th day of May, A. D., 1924.

ALFRED F. MASURY.
CHARLES FROESCH.